Aug. 12, 1930.  L. E. BARRINGER  1,772,743
COATED METAL ARTICLE AND PROCESS OF APPLYING COATINGS THEREOF
Original Filed Jan. 5, 1927
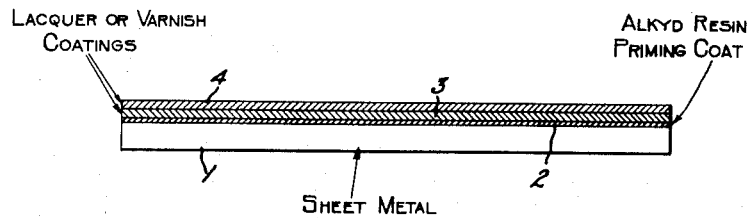
Inventor:
Lawrence E. Barringer,
by Charles E. Muller
His Attorney.

Patented Aug. 12, 1930

1,772,743

UNITED STATES PATENT OFFICE

LAWRENCE E. BARRINGER, OF SCHENECTADY, NEW YORK, ASSIGNOR TO GENERAL ELECTRIC COMPANY, A CORPORATION OF NEW YORK

COATED METAL ARTICLE AND PROCESS OF APPLYING COATINGS THEREOF

Application filed January 5, 1927, Serial No. 159,246. Renewed December 18, 1929.

The present invention comprises a combination of lacquers, which are particularly applicable to the coating of metal surfaces. Considerable difficulty has been encountered heretofore with certain lacquers, such as the cellulose lacquers due to their cracking away from the surface upon which they have been applied. In the case of metal surfaces, exposed to corroding or rusting conditions, as for example, in the case of automobiles, this is a serious drawback.

I have discovered that this difficulty can be overcome by providing metal surfaces with an underlying or priming coat of a resin made from a polyhydric alcohol, such as glycerine, and a polybasic acid, such as phthalic acid, and baking said resin. Examples of these resins are described in Callahan patents 1,108,329 and 1,108,330, and are referred to herein as alkyd resins. My present invention does not include the employment as a priming coat for metal articles of a resin containing a drying oil acid as described in the application of Horace H. Hopkins, Serial No. 179,713, filed March 30, 1927, (to be issued as U. S. Letters Patent 1,771,538 on July 29, 1930).

In some cases plasticising agents, such as indene, indene polymer, glycol diacetate, diethyl phthalate, tricresyl phosphate, triacetin, anisol and the like, may be introduced to advantage into the resin during its manufacture.

My invention is illustrated diagrammatically by the accompanying drawing.

Alkyd resins appear in three different stages, namely the A-stage resin which is fusible and solublie in volatile solvents, such as acetone, or ethyl lactate without heating the solvents, B-stage resin which softens but can not be fused and which swells in acetone especially when the acetone is heated, and C-stage resin which is non-fusible and softens to a lesser extent than the B-stage resin when heated and which does not swell in cold solvents. Both the B-stage and the C-stage resins can be brought into solution by heating to a sufficiently high temperature in contact with a solvent.

In accordanec with my present invention the metal article 1 which is to be coated with enamel, lacquer or the like first is provided with a coating 2 of clear alkyd A-stage resin, which contains little or no additional material, such as mineral filler or pigment. The clear alkyd resin may be applied in solution and the solvent caused to evaporate. The coating thus applied is then baked to harden the resin. Thereupon one or more coats 3, 4 of opaque lacquer or varnish are applied over the priming coat. For the superimposed lacquer preferably an air-drying lacquer is used, preferably a solution of cellulose compound.

For example, a suitable solution of alkyd resin, preferably a resin made from glycerol and phthalic anhydride is applied by dipping, spraying, brushing or otherwise on the surface of the metal, which may consist of iron, brass, copper, nickel, aluminum, or the like. I may use, for example, a solution of glycerol phthalate resin in a solvent consisting of 30 parts of acetone, 30 parts of benzol, 30 parts of alcohol and 10 parts of ethyl lactate by volume. A solution of .925 sp. gr. at 60° F. is suitable for spraying. A film produced by spraying this solution is air-dried and then baked for about 20 to 40 minutes at 125 to 175° C. thereby converting the resin to the B-stage.

The time and temperature to be chosen depend on the nature of the resin and other conditions. For instance, reducing the temperature must be accompanied by a longer period of baking or a shorter period of baking can be used by increasing the temperature. The adjustment of time, temperature and other baking conditions must be such as to expel all solvent from the lacquer and render the coating non-tacky but still soft enough to provide the proper "cling" for the lacquers to be superimposed. If a high boiling point solvent is present in the solution, some of it will be retained in the baked resin, increasing its flexibility. A cellulose lacquer (comprising butyl phthalate, dibutyl phthalate, ethyl lactate, ethyl acetate, glycol diacetate or similar volatilizable material as solvent) is applied, for example, by spraying. The solvent of the lacquer somewhat softens the resin and thereby binds the two films firmly together.

The time required for baking the resin coating and also the baking temperature may be reduced by converting the A-stage alkyd resin to the C-stage in mass, before it is applied on the surface to be coated, and dispersing the otherwise insoluble resin in a solvent by heating the resin in contact with the solvent in a closed space. For example, the heat-hardened glycerol-phthalate resin (known also as "glyptal") may be dispersed in a solvent, such as acetone or acetone oil by heating in an autoclave to a temperature of about 150 to 170° C. for about 36 hours. As some decomposition of the C-stage resin occurs during this treatment, some baking of a resin film resulting from the application of such solution is still desirable.

The ground or priming coat of clear resin adheres with extreme tenacity to a metal surface, and thus serves as binding coat whereby the outer layer of cellulose lacquer is held upon the metal. Such a priming coat also provides unusual elasticity and toughness for the entire covering. Better protection of oxidizable metals thus is secured and thereby great durability or life of objects so coated.

In some cases, opaque lacquer coatings other than cellulose lacquers may be applied upon the priming coat of alkyd resin. An alkyd resin containing a mineral filler or pigment, such as ponolith, a mixture of barium sulphate and zinc sulphide, may be applied over the priming coat of clear resin.

Although metal coatings prepared in accordance with my invention may be used for a wide variety of purposes, among these uses metals so coated can be used with particular advantage for the construction of refrigerators or other food containers because of the odorlessness of the coatings. Ornamental ware, electrical and other scientific instruments, wiring fixtures for domestic lighting may be advantageously coated by such resins.

What I claim as new and desire to secure by Letters Patent of the United States, is:

1. The combination of a metal article, a coating thereon comprising an alkyd resin, said resin having been converted to the infusible, insoluble state and a superimposed opaque coating comprising a cellulose compound.

2. The method of coating metal surfaces with cellulose lacquer which consists in applying a priming coat of alkyd resin in the A-stage to a surface to be coated, converting said resin to the B-stage, applying a lacquer comprising a cellulose ester and a solvent capable of entering into the alkyd resin and finally air drying.

3. The combination of a metal article, a coating thereon comprising a glycerol-phthalic anhydride resin which is substantially infusible and insoluble and a superimposed coating of cellulose composition.

In witness whereof, I have hereunto set my hand this 3d day of January, 1927.

LAWRENCE E. BARRINGER.